(12) United States Patent
Nagata et al.

(10) Patent No.: US 7,529,602 B2
(45) Date of Patent: May 5, 2009

(54) VEHICLE-INSTALLED REMOTE CONTROL UNIT

(75) Inventors: Hitomi Nagata, Kariya (JP); Yoshinori Katsuta, Okazaki (JP); Kenichi Ogino, Toyota (JP)

(73) Assignee: DENSO CORPORATION, Kariya (JP)

( * ) Notice: Subject to any disclaimer, the term of this patent is extended or adjusted under 35 U.S.C. 154(b) by 716 days.

(21) Appl. No.: 11/239,012

(22) Filed: Sep. 30, 2005

(65) Prior Publication Data

US 2006/0071808 A1 Apr. 6, 2006

(30) Foreign Application Priority Data

Oct. 4, 2004 (JP) .............................. 2004-291328

(51) Int. Cl.
*G05D 1/00* (2006.01)
*G05D 3/00* (2006.01)
*G08C 14/00* (2006.01)

(52) U.S. Cl. .................. 701/2; 340/825.72; 455/41.1; 455/41.2; 455/95; 455/418; 455/419; 375/256; 701/36; 180/287

(58) Field of Classification Search .............. 701/2, 701/36; 340/825.71–72, 825.57, 426.5, 426.13, 340/5.72, 825.62; 307/9.1; 455/41.1–41.2, 455/95, 418; 180/287; 375/256
See application file for complete search history.

(56) References Cited

U.S. PATENT DOCUMENTS

| 4,661,996 | A | * | 4/1987 | Scandurra | ................. 455/205 |
| 5,053,983 | A | * | 10/1991 | Hyatt | ......................... 708/306 |
| 5,218,276 | A | * | 6/1993 | Yeom et al. | .................... 318/16 |
| 5,270,704 | A | * | 12/1993 | Sosa Quintana et al. | ..................... 340/870.02 |
| 5,375,174 | A | * | 12/1994 | Denenberg | ................. 381/71.6 |
| 5,835,022 | A | | 11/1998 | Amano | |
| 6,078,672 | A | * | 6/2000 | Saunders et al. | ........... 381/71.6 |
| 6,850,252 | B1 | * | 2/2005 | Hoffberg | .................... 715/716 |

(Continued)

FOREIGN PATENT DOCUMENTS

EP 574634 A1 * 12/1993

(Continued)

OTHER PUBLICATIONS

A perceptual channel for information transfer over kilometer distances: Historical perspective and recent research; Puthoff, H.E.; Targ, R.; Proceedings of the IEEE; vol. 64, Issue 3, Mar. 1976 pp. 329-354.*

(Continued)

*Primary Examiner*—Cuong H Nguyen
(74) *Attorney, Agent, or Firm*—Posz Law Group, PLC

(57) ABSTRACT

The vehicle-installed remote control unit includes a receiver receiving a command signal transmitted from a transmitter dedicated to a vehicle, and a controller controlling a part of the vehicle in accordance with the command signal received by the receiver. The controller has a noise-decision function of deciding whether or not a signal received by the receiver is a noise, a record function of recording noise information including at least information specifying a time at which the signal received by the receiver is decided to be the noise by the noise-decision function in a memory included in the controller, and an output function of outputting the noise information recorded in the memory to an external device in response to a command received from the external device.

7 Claims, 5 Drawing Sheets

U.S. PATENT DOCUMENTS

| | | | | |
|---|---|---|---|---|
| 7,069,119 | B2* | 6/2006 | Ueda et al. | 701/2 |
| 2002/0124649 | A1* | 9/2002 | Kim et al. | 73/432.1 |
| 2004/0005864 | A1* | 1/2004 | Eray | 455/41.2 |
| 2005/0046584 | A1* | 3/2005 | Breed | 340/825.72 |
| 2005/0102048 | A1* | 5/2005 | Anderson et al. | 700/94 |
| 2006/0071808 | A1* | 4/2006 | Nagata et al. | 340/825.72 |
| 2008/0266068 | A1* | 10/2008 | Farrell et al. | 340/426.17 |

FOREIGN PATENT DOCUMENTS

| | | | |
|---|---|---|---|
| EP | 1024595 | A2 | 1/2000 |
| EP | 1024595 | A2 * | 8/2000 |
| FR | 2669167 | A1 * | 5/1992 |
| JP | 8-4385 | | 1/1996 |
| JP | 08053963 | A * | 2/1996 |
| JP | 9-41754 | | 2/1997 |
| JP | 2002-129794 | | 5/2002 |
| JP | 2004182126 | A * | 7/2004 |
| JP | 2007336102 | A * | 12/2007 |

OTHER PUBLICATIONS

A comparison of Gaussian mixture and artificial neural network models for voiced-based access control system of building security; Wahyudi,; Astuti, Winda; Mohamed, Syazilawati; Information Technology, 2008. ITSim 2008. International Symposium on; vol. 3, Aug. 26-28, 2008 pp. 1-8; Digital Object Identifier 10.1109/ITSIM.2008.4632008.*

Cybersecurity; Kemmerer, R.A.; Software Engineering, 2003. Proceedings. 25th International Conference on; May 3-10, 2003 pp. 705-715; Digital Object Identifier 10.1109/ICSE.2003.1201257.*

Adaptive harmonic noise cancellation with an application to distribution power line communications; Wang, J.-D.; Trussell, H.J.; Communications, IEEE Transactions on; vol. 36, Issue 7, Jul. 1988 pp. 875-884; Digital Object Identifier 10.1109/26.2818.*

2008 IEEE radio frequency integrated circuits (RFIC) symposium; Radio Frequency Integrated Circuits Symposium, 2008. RFIC 2008. IEEE; Jun. 17, 2008-Apr. 17, 2008 pp. i-102; Digital Object Identifier 10.1109/RFIC.2008.4561371.*

Sequential signal encoding from noisy measurements using quantizers with dynamic bias control; Papadopoulos, H.C.; Wornell, G.W.; Oppenheim, A.V.; Information Theory, IEEE Transactions on; vol. 47, Issue 3, Mar. 2001 pp. 978-1002 Digital Object Identifier 10.1109/18.915654.*

Remote Control Over Noisy Communication Channels: A First-Order Example; Sarma, S.V.; Dahleh M.A.; Automatic Control, IEEE Transactions on; vol. 52, Issue 2, Feb. 2007 pp. 284-289; Digital Object Identifier 10.1109/TAC.2006.886539.*

Transform methods for remote sensing environmental monitoring; Chi Hau Chen; Acoustics, Speech and Signal Processing, 2008. ICASSP 2008. IEEE International Conference on; Mar. 31, 2008-Apr. 4, 2008 pp. 5165-5168; Digital Object Identifier 10.1109/ICASSP.2008.4518822.*

A new filtering algorithm based on image spatial clustering technique; Hongrui Zhao; Hong Wang; Hong Shi; Xiaoguang Li; Fenghua Wu; Geoscience and Remote Sensing Symposium, 2004. IGARSS '04. Proceedings. 2004 IEEE International vol. 3, Sep. 20-24, 2004 pp. 1591-152b vol. 3; Digital Object Identifier 10.1109/IGARSS.2004.1370627.*

Design of GPS Remote Calibration System; Chia-Shu Liao; Hsin-Min Peng; Huang-Tien Lin; Shinn-Yan Lin; Kun-Yuan Tu; Han Shyu; Frequency Control Symposium, 2007 Joint with the 21st European Frequency and Time Forum. IEEE International May 29, 2007-Jun. 1, 2007 pp. 914-917; Digital Object Identifier 10.1109/FREQ.2007.4319212.*

Influence of multiplicative noise variance evaluation accuracy of mm-band SLAR image filtering efficiency Abramov, S.K.; Lukin, W.; Ponomarenko, N.N.; Egiazarian, K.O.; Pogrebnyak, O.B.;Physics and Engineering of Microwaves, Millimeter, and Submillimeter Waves, 2004. MSMW 04. The Fifth International Kharkov Symposium on; vol. 1, Jun. 21-26, 2004.*

De-noising remotely sensed digital imagery; Chettri, S.; Campbell, W.; Advances in Techniques for Analysis of Remotely Sensed Data, 2003 IEEE Workshop on; Oct. 27-28, 2003 pp. 193-201; Digital Object Identifier 10.1109/WARSD.2003.1295193.*

Chinese Office Action issued for corresponding Chinese Patent Application No. 2005101165943 dated Feb. 6, 2009 (English translation attached).

* cited by examiner

VEHICLE-INSTALLED REMOTE CONTROL UNIT

CROSS-REFERENCE TO RELATED APPLICATION

This application is related to Japanese Patent Application No. 2004-291328 filed on Oct. 4, 2004, the contents of which are hereby incorporated by reference.

BACKGROUND OF THE INVENTION

1. Field of the Invention

The present invention relates to a vehicle-installed remote control unit for remotely controlling various parts of a vehicle in response to command signals transmitted from a vehicle dedicated portable transmitter.

2. Description of Related Art

There is known a key-less entry system for remotely locking and unlocking doors of a vehicle in response to command signals radio-transmitted from a portable transmitter carried by a user of the vehicle (refer to Japanese Patent Applications Laid-open No. 2002-129794 and No. 9-41754, for example).

In the key-less entry system, there is a possibility that the remote door lock or unlock operation is not performed despite the manipulation of the portable transmitter when the vehicle is parked near an electromagnetic radiation source such as a power transmission plant or a broadcast antenna, because the vehicle-installed remote control unit cannot detect a command signal transmitted from the portable transmitter when a large noise is emitted from the electromagnetic radiation source.

When such a system inoperative has occurred, to diagnose its cause, it is necessary to determine whether it relates to the ambient noise or device malfunction in the first place.

It is common that, when a car dealer or a car maker has received a complaint from a car user about the inoperative of a remote control system such as the key-less entry system, they send engineers to the scene together with a measuring instrument such as a spectrum analyzer to make a survey on the radio wave conditions around the vehicle or the vehicle-installed remote control unit.

Accordingly, finding the cause of the inoperative of the remote control system has been a troublesome and time-consuming task.

SUMMARY OF THE INVENTION

The present invention provides a vehicle-installed remote control unit including:

a receiver receiving a command signal transmitted from a transmitter dedicated to a vehicle; and a controller controlling a part of the vehicle in accordance with the command signal received by the receiver;

the controller having a noise-decision function of deciding whether or not a signal received by the receiver is a noise, a record function of recording noise information including at least information specifying a time at which the signal received by the receiver is decided to be the noise by the noise-decision function in a memory included in the controller, and an output function of outputting the noise information recorded in the memory to an external device in response to a command received from the external device.

With the invention, for example, when the vehicle doors are not locked or unlocked normally by the manipulation of the transmitter, it is possible to determine, without making preparations for any noise measuring instrument such as a spectrum analyzer, whether the cause of the system inoperative is related to device malfunction or ambient noise by checking the contents of the noise information piece recorded in the memory by use of the external device (diagnostic device).

PREFERRED EMBODIMENTS OF THE INVENTION

Figure 1:
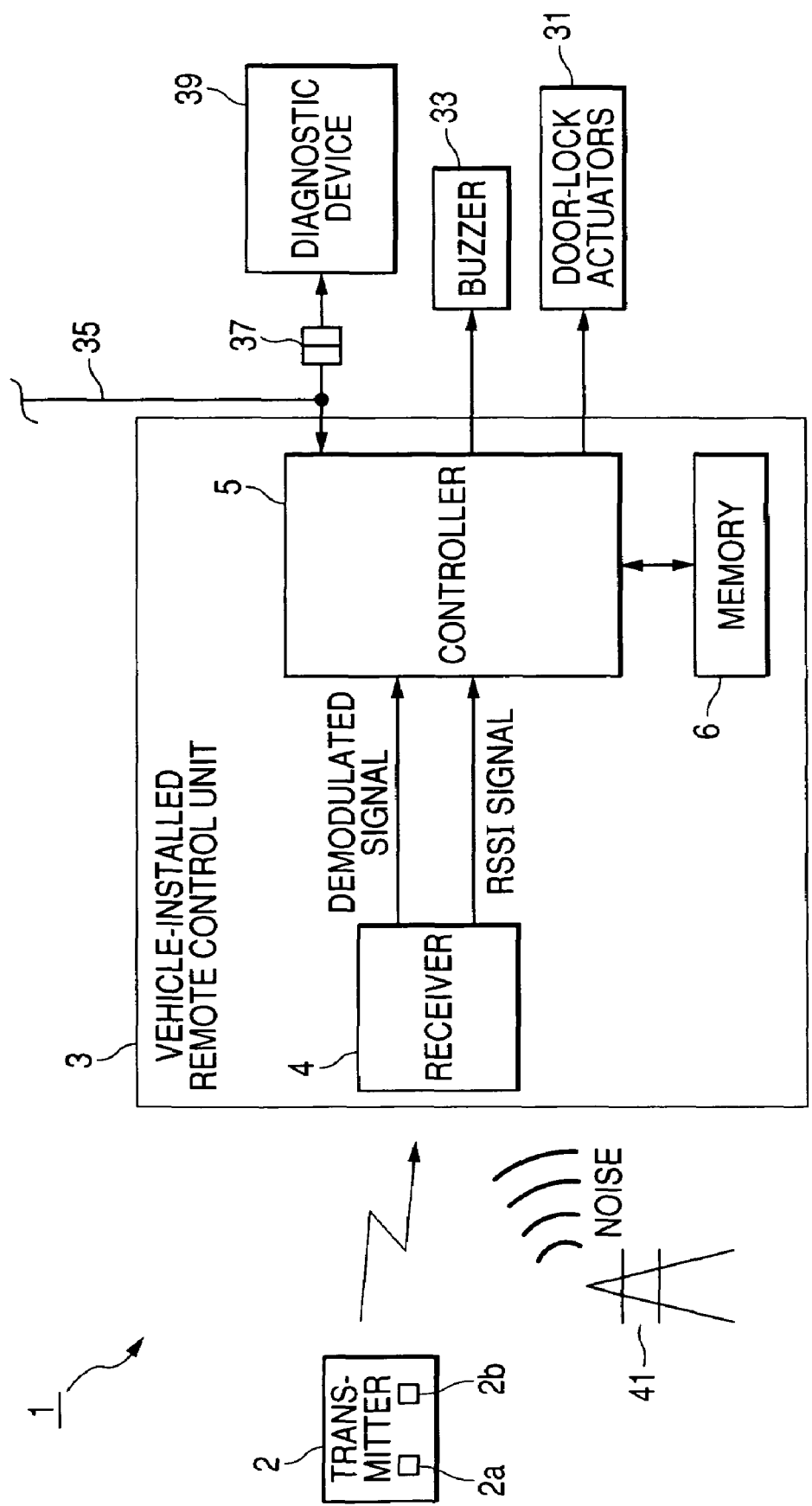
FIG. 1 is a schematic diagram showing a configuration of a key-less entry system using a vehicle-installed remote control unit according to an embodiment of the invention and a portable transmitter.

FIG. 1 is a schematic diagram showing a configuration of a key-less entry system 1 including a vehicle-installed remote control unit 3 according to an embodimen of the invention and a portable transmitter 2 carried by a user of a vehicle.

The transmitter 2 is configured to radio-transmit a command signal (in the form of a 315-MHz band radio signal, for example) when one of a lock button 2a and an unlock button 2b provided in the transmitter 2 is pushed. The command signal includes a command to lock the vehicle doors when the lock button 2a is pushed, and includes a command to unlock the vehicle doors when the unlock button 2b is pushed.

The vehicle-installed remote control unit 3 includes a receiver 4 receiving the command signal transmitted from the transmitter 2, a controller 5 and a memory 6 for storing various information. The controller 5 may be constituted by a microcomputer.

The memory 6 may be a RAM or ROM (EEPROM or a flash ROM).

The remote control unit 3 is cable-connected to door-lock actuators 31 respectively provided for each of the vehicle doors, and a buzzer 33.

The remote control unit 3 receives an ignition switch signal indicative of the on/off state of an ignition switch (not shown) of the vehicle. The remote control unit 3 is also connected to other vehicle-installed control units (not shown) via a communication cable 35 for data communication thereamong. A diagnostic device 39 for carrying out fault diagnosis of the vehicle is connected to the communication cable 35 through a connector 37.

The remote control unit 3 can perform data transmission with the diagnostic device 39.

When a command signal transmitted from the transmitter 2 is received by the receiver 4 of remote control unit 3, the controller 5 checks whether or not ID information (identifying information) contained in the command signal matches ID information which is specific to the vehicle on which the remote control unit 3 is installed and is prestored in the memory 6. If the check result is affirmative, the controller 5 drives the door-lock actuators 31 to lock or unlock the vehicle doors depending on the content of the command contained in the command signal. In addition, the controller 5 informs the user of the vehicle doors having been locked or unlocked by sounding the buzzer 33.

Figure 2:
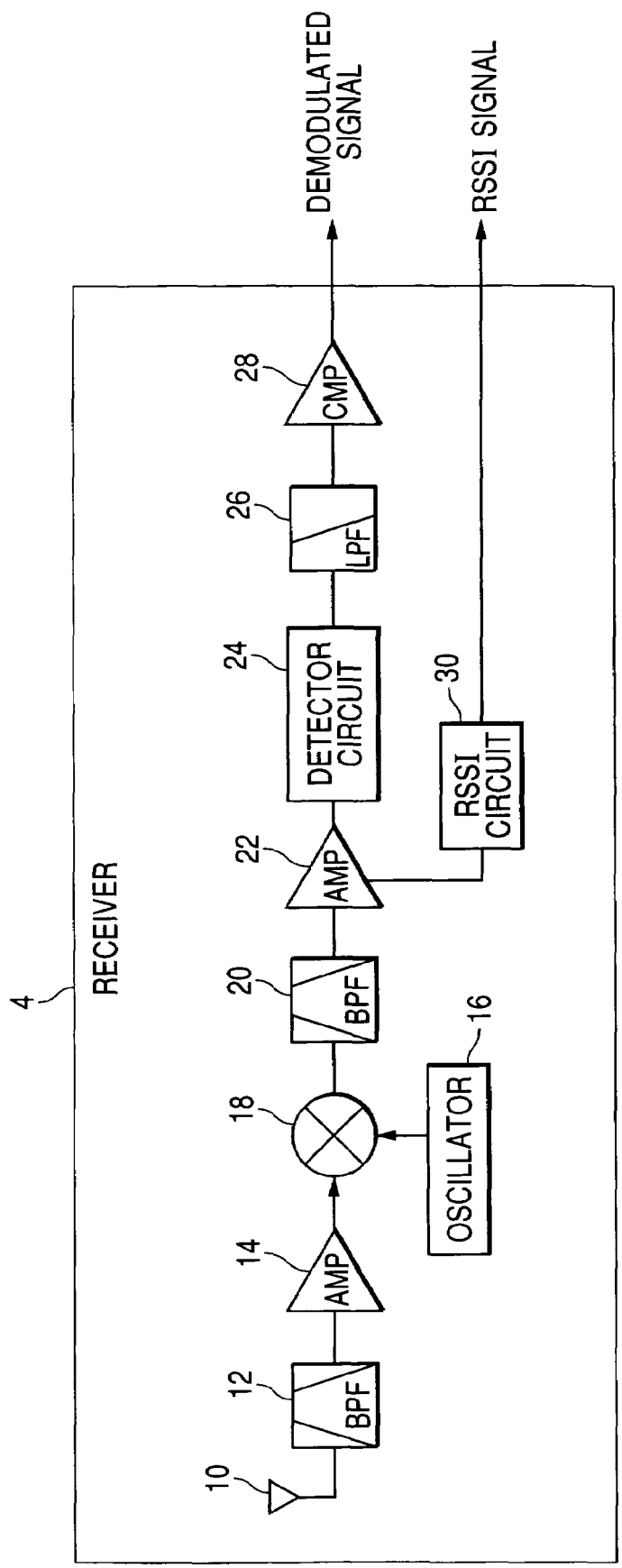
FIG. 2 is a block diagram showing a configuration of a receiver of the vehicle-installed remote control unit according to the embodiment of the invention.

FIG. 2 shows a configuration of the receiver 4 of the remote control unit 3. As shown in this figure, the receiver 4 includes an antenna 10 receiving radio waves, a band-pass filter 12 allowing, of the signals received by the antenna 10, only the command signal transmitted from the transmitter 2 to pass, an amplifier 14 amplifying the command signal passed through the band-pass filter 12, a local oscillator 16 producing a local oscillation signal used for frequency conversion of the command signal, a mixing circuit 18 mixing the command signal amplified by the amplifier 14 with the local oscillation signal produced by the local oscillator 16 to thereby convert the frequency of the command signal into a predetermined intermediate frequency, a band-pass filter 20 allowing only the command signal whose frequency has been converted into the intermediate frequency, an amplifier 22 amplifying the command signal passed through the band-pass filter 20, a detector 24 detecting the command signal amplified by the amplifier 22, a low-pass filter 26 removing unnecessary high frequency components from the command signal detected by the detector 24, and a comparator 28 reconstituting serial data contained in the command signal by comparing the command signal passed through the low-pass filter 26 with a reference voltage, and outputting the reconstituted serial data as a demodulated signal.

The controller 5 controls the door-lock actuators 31 in accordance with this demodulated signal received from the comparator 28. The receiver 4 further includes an RSSI (Received Signal Strength Indicator) circuit 30 connected to the amplifier 22 amplifying the command signal whose frequency has been converted into the intermediate frequency.

The RSSI circuit 30 is for detecting electric power consumption of the amplifier 22 on the basis of a current flowing into the amplifier 22, and outputting a voltage signal indicative of the electric power consumption of the amplifier 22 as an RSSI signal. When the signal inputted into the amplifier 22 from the band-pass filter 20 is small, the output signal of the amplifier 22 is small and the electric power consumption of the amplifier 22 is therefore small. On the other hand, when the signal inputted into the amplifier 22 from the band-pass filter 20 is large, the output signal of the amplifier 22 is large and the electric power consumption of the amplifier 22 is therefore large. Accordingly, the RSSI signal outputted from the RSSI circuit 30 can be used as a signal indicative of the strength of a signal being received by the receiver 4.

The controller 5 of the remote control unit 3 performs a specific noise-decision process to decide whether or not the signal received by the receiver 4 is a noise, and records noise information in the memory 6 each time it decides that the signal received by the receiver 4 is a noise to create a noise history.

The noise-decision process performed by the controller 5 is explained below with reference to the flowchart shown in FIG. 3. When the noise-decision process is started, the process stands by for a certain time period T1 (one second, for example) at step S110.

Next, it is checked at step S120 whether the ignition switch is in the on or off state. If it is determined that the ignition switch is in the off state, the process moves to step S130 where the RSSI signal outputted from the receiver 4 is read, and it is checked whether or not the voltage of the RSSI signal (referred to as the RSSI value hereinafter) is equal to or larger than a predetermined threshold Rh.

If the check result at step S130 is affirmative, the process moves to step S140 where a noise-decision counter CN included in the controller 5 is incremented by one.

Subsequently, it is checked at step S150 whether or not the count value of the noise-decision counter CN is smaller than a maximum capacity CNmax of the noise-decision counter CN. If it is determined that the count value of the noise-decision counter CN is smaller than the maximum capacity CNmax, the process returns to step S110.

If it is determined at step S120 that the ignition switch is not in the off state, that is, the ignition switch is in the on state, or if it is determined at step S130 that the RSSI value is smaller than the threshold Rh, or if it is determined at step S150 that the count value of the noise-decision counter CN is not smaller than the maximum capacity CNmax, that is, the count value has reached the maximum capacity CNmax, the process moves to step S160 to check where the count value of the noise-decision counter CN is equal to or larger than a preset repetition number Nh which is larger than one and smaller than the maximum capacity CNmax. If it is determined that the count value of the noise-decision counter CN is equal to or larger than the preset repetition number Nh, the process moves to step S170 regarding that the signal received by the receiver 4 is a noise.

The repetition number Nh may be stored in the memory 6. Since the repetition number Nh is smaller than the maximum capacity CNmax, when the process moves from step S150 to step S160, the check result at step S160 becomes affirmative without exception, and accordingly the process further moves to step S170.

At step S170, a code indicative of the receiver 4 having received a noise, the current time (the time at which it is determined that the signal received by the receiver 4 is the noise at step S160), and the count value of the noise-decision counter CN at this moment are recorded in the memory 6 as one noise information piece.

The controller 5 has a free-run counter (or free-run timer) configured to start count-up when the remote control unit 3 starts its operation by being supplied with electricity from a vehicle battery. The count value of the free-run counter is used as information indicative of the current time. If a specific area for storing the noise information in the memory 6 has become full of a plurality of the noise information pieces recorded at different times, the oldest noise information piece is erased to provide a space for storing the last noise information piece.

When a noise information piece is recorded in the memory 6 at step S170, or when it is determined at step S160 that the count value of the noise-decision counter CN is smaller than the preset repetition number Nh, the process moves to step S180 to reset the noise-decision counter CN to zero. After that, the process returns to step S110.

As explained above, the controller 5 checks, while the ignition switch is in the off state, whether or not the received signal strength (the RSSI value) is equal to or larger than the threshold Rh at step S130, and increments the noise-decision counter CN by one at step S140 each time it is determined that the received signal strength (the RSSI value) is equal to or larger than the threshold Rh.

Further, the controller 5 checks at step S160 whether or not the count value of the noise-decision counter CN is equal to or larger than the preset repetition number Nh each time the ignition switch is detected to be turned on at step S120, or it is determined that the RSSI value is smaller than the threshold Rh at step S130, or it is determined at step S150 that the count value of the noise-decision counter CN has reached the maximum capacity CNmax. If the check result at step S160 is affirmative (if the count value of the noise-decision counter CN is equal to or larger than the preset repetition number Nh), since it means that the determination that the RSSI value is equal to or larger than the threshold Rh has been continuously made without a break at step S130 for a time period longer than T1×Nh, the controller 5 judges that the signal received by the receiver 4 is a noise, and records at step S170 the noise information piece including the count value of the free-run counter as the information indicative of the current time, the count value of the noise-decision filter CN at this moment in the memory 6. After that, the controller 5 resets the noise-decision counter CN to zero at step S180.

In the normal use state of the transmitter 2, since the button 2a or 2b is not pushed continuously for a time period longer than T1×Nh, the command signal is not transmitted continuously for a time period longer than T1×Nh from the transmitter 2. Furthermore, the transmitter 2 is configured not to transmit the command signal continuously for a time period T2 (20 seconds, for example) even when the button 2a or 2b is continuously pushed for a long time. In this embodiment, the time period T1, the preset repetition number Nh, and the time period T2 satisfy the relationship of T1×Nh>T2, so that any received signal can be determined to be not the command signal transmitted from the transmitter 2 but a noise if it has a time duration not shorter than T1×Nh.

Figure 4:
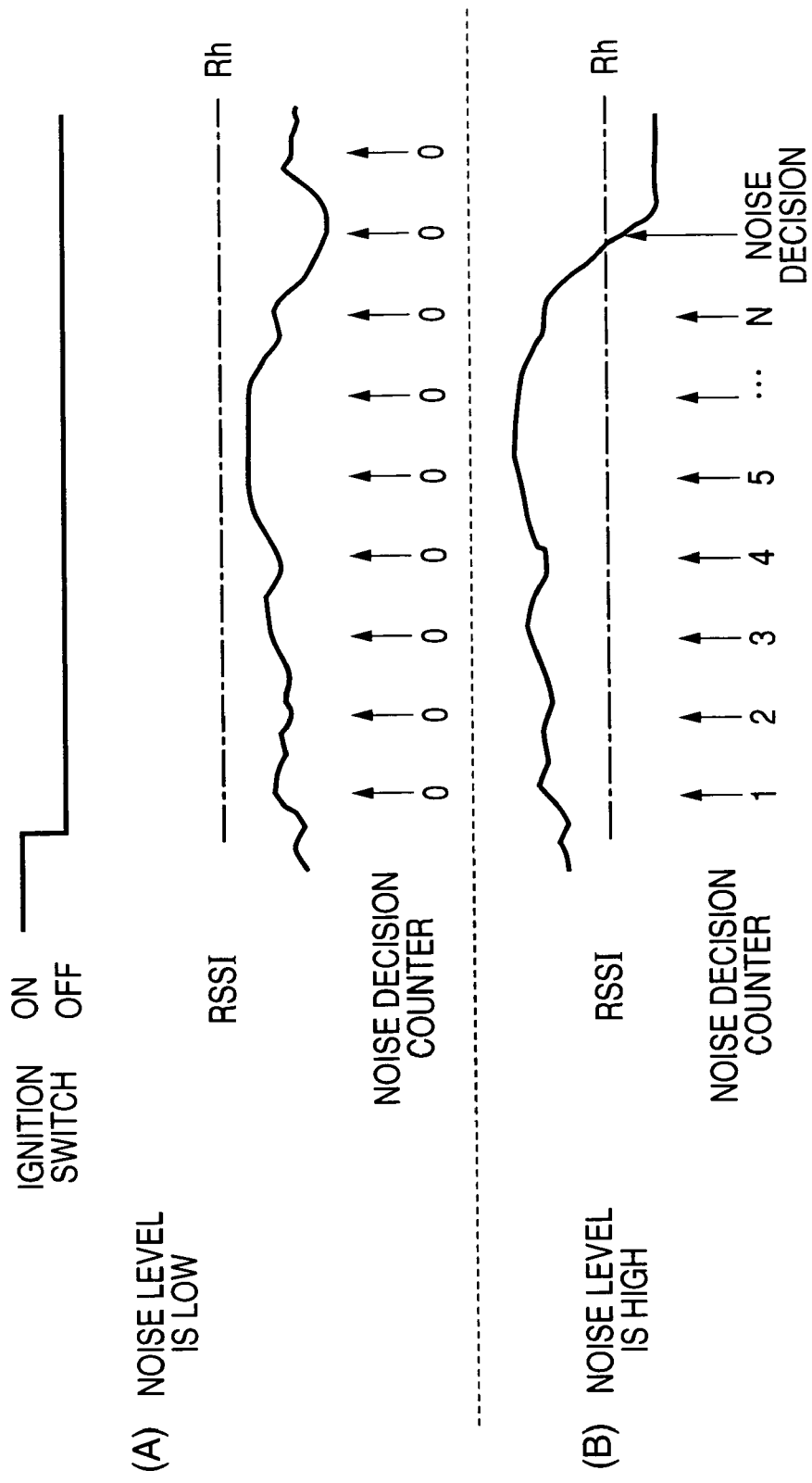
FIG. 4 is a diagram showing examples of temporal change of the count value of a noise-decision counter when the noise-decision process is performed.

FIG. 4 shows examples of temporal change of the count value of the noise-decision counter CN when the above described noise decision process is performed. When ambient noise is at a low level, and the RSSI value therefore continues to be lower than the threshold Rh while the ignition switch is in the off state, the count value of the noise-decision filter CN continues to be zero as shown in (A) in FIG. 4.

On the other hand, when ambient noise is at a high level, for example, when the vehicle is parked near a noise source 41 (see FIG. 1) such as a power transmission plant or a broadcast antenna, and the RSSI value therefore exceeds the threshold Rh, the count value of the noise-decision filter CN is incremented by one at constant time interval equal to the time period T1 as shown in (B) in FIG. 4. When the RSSI value becomes smaller than the threshold Rh, it is checked whether or not the count value of the noise-decision filter CN is equal to or larger than the preset repetition number Nh. If the check result is affirmative, it is determined that the signal received by the receiver 4 is a noise, and the noise information is recorded in the memory 6.

The controller 5 of the vehicle-installed remote control unit 3 is configured to perform also a noise information output process paralleling the above explained noise decision process. The noise information output process is explained below with reference to the flowchart shown in FIG. 5. As shown in this figure, when the noise information output process is started, the process stands by until the controller 5 receives a noise information read request from the diagnostic device 39 (step S210). If it is determined at step S210 that the noise information read request is received, the process moves to step S220 to check whether or not any noise information piece is contained in the memory 6. If the check result is negative, the process returns to step S210. If the check result at step S220 is affirmative, the process moves to step S230 where all the noise information pieces are read from the memory 6 and sent to the diagnostic device 39 together with the count value of the free-run counter at this moment (referred to as current free-run counter's value hereinafter).

The contents of the noise information pieces and the current free-run counter's value are displayed in a display of the diagnostic device 39. It is possible to determine the time at which each noise information piece was recorded in the memory 6 on the basis of the difference between the current free-run counter's value and the count value of the free-run counter contained in each noise information piece. The diagnostic device 39 may be so configured as to calculate, for each noise information piece, the difference between the current free-run counter's value and the count value of the free-run counter contained in the noise information piece, and calculate the time at which the noise information piece was recorded in the memory 6 on the basis of the calculated difference, and display this calculated time in the display.

Figure 5:
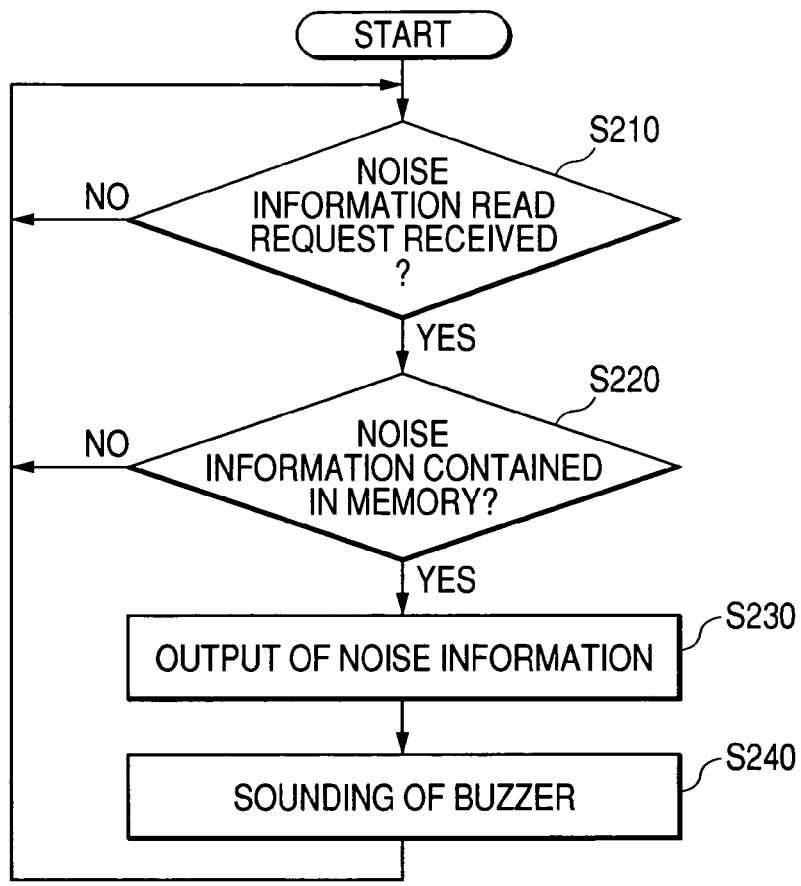
FIG. 5 is a flowchart showing a noise information output process performed by the controller of the vehicle-installed remote control unit according to the embodiment of the invention.

Referring back to the flowchart of FIG. 5, the controller 5 sounds the buzzer 33 at subsequent step S240 to make notification of the fact that the noise information pieces are contained in the memory 6. As explained above, the noise information pieces recorded in the memory 6 can be read by connecting the diagnostic device 39 to the communication cable 35 through the connector 37, and sending the noise information read request to the vehicle-installed remote control unit 3 by manipulating the diagnostic device 39.

Figure 6:
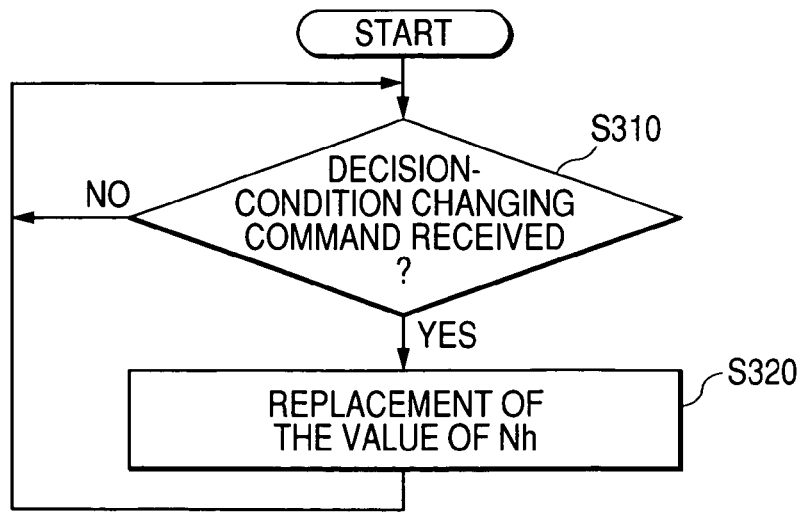
FIG. 6 is a flowchart showing a decision-condition changing process performed by the controller of the vehicle-installed remote control unit according to the embodiment of the invention.

The controller 5 of the remote control unit 3 is configured to perform also a decision-condition changing process shown in the flowchart of FIG. 6. As shown in this figure, when the decision-condition changing process is started, the process stands by until the controller 5 receives a decision-condition changing command from the diagnostic device 39 connected to the communication cable 35 (step S310). If it is determined that the decision-condition changing command is received by the controller 5, the process moves to step S320 where the controller 5 receives a new value of the repetition number Nh used at step S160 in the flowchart of FIG. 3, and replace the old value of Nh stored in the memory 6 with this new value.

Figure 3:
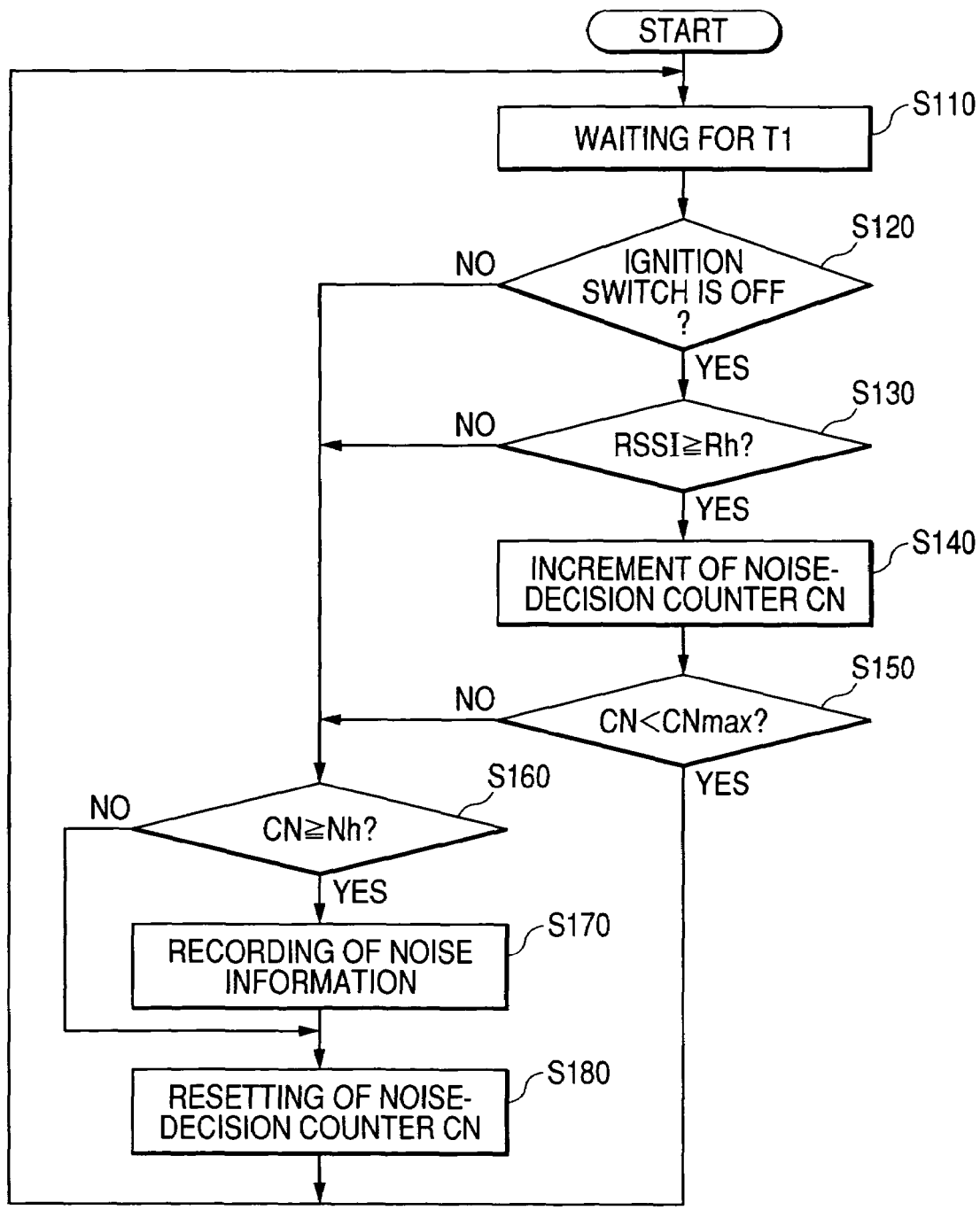
FIG. 3 is a flowchart showing a noise-decision process performed by a controller of the vehicle-installed remote control unit according to the embodiment of the invention.

As explained above, it is possible to change the value of the repetition number Nh used at step S160 in the flowchart of FIG. 3 by sending the decision-condition changing command and the new value of the repetition number Nh from the diagnostic device 39 to the vehicle-installed remote control unit 3 With this embodiment of the invention, when the vehicle doors are not locked or unlocked normally by the manipulation of the button 2a, or 2b of the transmitter 2, it is possible to determine, without making preparations for any noise measuring instrument such as a spectrum analyzer, whether the cause is related to device malfunction or ambient noise by connecting the diagnostic device 39 to the communication cable 35 and checking the contents of the noise information pieces sent from the vehicle-installed remote control unit 3 and displayed in the display of the diagnostic device 39.

Specifically, it can be said the cause of the inoperative of the key-less entry system is related to ambient noise if the time at which the system inoperative took place is about the same as one of the times at which the noise information pieces were recorded in the memory 6. On the other hand, it can be said the cause of the inoperative of the key-less entry system is related to device malfunction if the time at which the system inoperative took place is different from any one of the times at which the noise information pieces were recorded in the memory 6. Hence, with this embodiment, it is possible to avoid misjudging the cause of the system inoperative and mistakenly replacing the transmitter 2 or vehicle-installed remote control unit 3 with a new one.

In addition, the present embodiment makes it possible to judge whether or not the signal received by the receiver 4 is a noise without analyzing the contents of received signals, since the controller 5 is configured to make a notification that the receive 4 has received a noise if the RSSI value exceeds the threshold RH for a time period longer than T1×Nh.

Furthermore, with the present embodiment, it is possible to know the duration of a received noise on the basis of the count value of the noise-decision filter CN recorded in the memory 6 as a part of the noise-information piece which can be read from the memory 6 and sent to the diagnostic device 39. More specifically, since the count value of the noise-decision filter CN recorded in the memory 6 is a value corresponding to the number of times that the RSSI value is determined to be not smaller than the threshold Rh at step S130 continuously without a break, the noise duration can be determined as the count value of the noise-decision filter CN multiplied by T1. Determining the noise duration makes it possible to determine a possible noise source, and to conduct a further detail survey.

It should be noted that, since the controller 5 is configured to record only one noise information piece when the check result at step 130 has become negative and it is determined that CN≧Nh at step S160, the space of the memory 6 can be saved irrespective of how long the noise duration is.

It also should be noted that the diagnosis of the cause of the system inoperative may be eased by changing the repetition number Nh used at step S160 from a larger value to a smaller value stepwise by use of the diagnostic device 39.

Although the remote control unit 3 is configured to perform the comparison between the RSSI value and the threshold Rh at constant time interval equal to T1, it may be so configured as to continuously perform the comparison between the RSSI value and the threshold Rh by use of a comparator and to measure the time while the output of the comparator indicates "RSSI value ≧Rh" by use of a timer for example. In this case, it is checked whether or not the clocking of the timer when the output of the comparator has changed to indicate "RSSI value<Rh" is larger than a predetermined time.

In this embodiment, although the count value of the free-run counter is used as the information for determining the time at which a noise has been received by the receiver 4 and the current time, if the vehicle is provided with a device providing the standard time such as the GPS, it is possible to obtain such time information from such a device instead of the free-run counter.

Furthermore, this embodiment may be so configured as to record the times at which the remote door-lock or unlock operations were performed normally in the memory 6 to create a normal operation history separately from the noise history.

The noise decision process may be modified such that the content or data format of the demodulated signal is also checked at step S130. In this case, if it is determined that the content or data format of the demodulated signal is not the one of the command signal transmitted from the transmitter 2, the process moves to step S140.

The value of the threshold Rh used at step S130 in the noise-decision process may be changeable in accordance with a command sent from the diagnostic device 39 as well as the threshold Rh used in step S160.

Furthermore, instead of the RSSI circuit 30 measuring the consumption current of the amplifier 22, a voltage measuring circuit detecting the received signal outputted from the band-pass filter 20 and measuring the voltage of the detected signal may be used as the means for measuring the strength of the received signal.

Although the above described embodiment relates to the key-less entry system, the present invention is applicable to any remote control system using a vehicle-installed remote control unit and a portable transmitter.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-installed remote control unit comprising:
a receiver receiving a command signal transmitted from a transmitter dedicated to a vehicle; and
a controller controlling a part of said vehicle in accordance with said command signal received by said receiver;
said controller having a noise-decision function of deciding whether or not a signal received by said receiver is a noise, a record function of recording noise information including at least information specifying a time at which said signal received by said receiver is decided to be said noise by said noise-decision function in a memory included in said controller, and an output function of outputting said noise information recorded in said memory to an external device in response to a command received from said external device.

2. The vehicle-installed remote control unit according to claim 1, wherein noise-decision function has a signal strength determining function of making a determination whether or not a strength of said signal received by said receiver is equal to or larger than a predetermined threshold, and is configured to decide that said signal received by said receiver is said noise, if said signal strength determining function continuously makes an affirmative determination at a constant time interval for a time period not shorter than a predetermined time that said strength of said signal received by said receiver is equal to or larger than said predetermined threshold.

3. The vehicle-installed remote control unit according to claim 2, wherein said signal strength determining function has a time measuring function of measuring a time duration during which said signal strength determining function continuously makes said affirmative determination until said signal strength determining function determines that said strength of said signal received by said receiver becomes smaller than said predetermined threshold, and said record function is configured to record said time duration measured by said time measuring function in said memory as a part of said noise information.

4. The vehicle-installed remote control unit according to claim 3, wherein said noise-decision function is decide that said signal received by said receiver is said noise, if said time duration measured by said time measuring function is equal to or longer than said predetermined time.

5. The vehicle-installed remote control unit according to claim 2, wherein said predetermined time is changeable in accordance with a command sent from said external device.

6. The vehicle-installed remote control unit according to claim 1, wherein said external device is a diagnostic device carrying out fault diagnosis of said vehicle.

7. The vehicle-installed remote control unit according to claim 1, wherein said controller is configured to lock and unlock doors of said vehicle in accordance with said command signal transmitted from said transmitter and received by said receiver.

\* \* \* \* \*